United States Patent
Iori et al.

(10) Patent No.: US 9,699,539 B2
(45) Date of Patent: Jul. 4, 2017

(54) STEREO MICROPHONE FOR MOBILE DEVICES

(71) Applicant: IK MULTIMEDIA PRODUCTION SRL, Modena (IT)

(72) Inventors: Enrico Iori, Provincia de Chiriqui-David (PA); Davide Barbi, Carpi (IT)

(73) Assignee: IK MULTIMEDIA PRODUCTION SRL, Modena (IT)

( * ) Notice: Subject to any disclaimer, the term of this patent is extended or adjusted under 35 U.S.C. 154(b) by 0 days.

(21) Appl. No.: 14/843,154

(22) Filed: Sep. 2, 2015

(65) Prior Publication Data
US 2016/0066074 A1  Mar. 3, 2016

(30) Foreign Application Priority Data

Sep. 3, 2014  (IT) .............................. MO2014A0248

(51) Int. Cl.
| | | |
|---|---|---|
| H04R 5/00 | (2006.01) | |
| H04R 1/08 | (2006.01) | |
| H04M 1/60 | (2006.01) | |
| H04M 1/725 | (2006.01) | |
| H04R 5/027 | (2006.01) | |

(52) U.S. Cl.
CPC ............ *H04R 1/08* (2013.01); *H04M 1/6033* (2013.01); *H04M 1/72527* (2013.01); *H04R 5/027* (2013.01); *H04R 2201/025* (2013.01); *H04R 2420/09* (2013.01); *H04R 2499/11* (2013.01)

(58) Field of Classification Search
None
See application file for complete search history.

(56) References Cited

U.S. PATENT DOCUMENTS

| | | | | |
|---|---|---|---|---|
| 2003/0132884 A1* | 7/2003 | Ragner | ................... | H01Q 1/245 343/702 |
| 2005/0125570 A1* | 6/2005 | Olodort | ................... | G06F 1/162 710/15 |
| 2008/0031606 A1* | 2/2008 | Zax | ........................ | G03B 29/00 396/56 |
| 2014/0064497 A1* | 3/2014 | Gotoh | ...................... | H04R 5/04 381/28 |

FOREIGN PATENT DOCUMENTS

WO   WO 2004/112426 A1   12/2004

OTHER PUBLICATIONS

Blue Microphones: "MIKEY digital user guide", Internet Citation, Aug. 26, 2012, pp. 1-11, retrieved from the internet: URL:http://cdn.bluemic.com/pdf/mikey_digital/MIKEYdigital_manual_English.pdf, retrieved on Apr. 9, 2013.

* cited by examiner

*Primary Examiner* — Muhammad N Edun
(74) *Attorney, Agent, or Firm* — Scully, Scott, Murphy & Presser, P.C.

(57) ABSTRACT

A stereo microphone for mobile devices, comprising a coupling body provided with elements for electromechanical connection to a mobile device and a supporting body for sound wave transducer means, which are integral therewith, the supporting body being pivoted to the coupling body by way of pivoting elements that allow its rotation about a single rotation axis for transition between a first shooting configuration, which corresponds to the use of the mobile device in portrait mode, and a second shooting configuration, which corresponds to the use of the mobile device in landscape mode.

10 Claims, 10 Drawing Sheets

STEREO MICROPHONE FOR MOBILE DEVICES

The present invention relates to a stereo microphone for mobile devices.

BACKGROUND OF THE INVENTION

Stereo microphones are known which can be connected to mobile devices, such as for example smartphones and tablets, for the stereo shooting of sounds, optionally in association with images.

According to conventional stereo shooting technique, such microphones have two sound transducing cartridges that transmit distinct audio information streams, each of which is intended to be played by a different speaker. During audio shooting and capture, such cartridges must be placed one on the right and one on the left with respect to the sound source, so as to reproduce in the recording the characteristic of human hearing of being able to distinguish the origin of sounds.

Mobile devices, in particular the already cited smartphones and tablets, have two operating modes: a vertical mode, known technically as "portrait", in which the device is held so that its extension is vertical and which is used typically for audio shots, and a horizontal mode, technically known as "landscape", in which the device is arranged so that its extension is horizontal and which is generally used for audio-video shots.

However, most currently known stereo microphones allow correct stereo shooting of sound only when the mobile device is in a vertical position, owing to the placement of the sound transducing cartridges.

In order to be able to obtain a stereo recording regardless of the operating mode of the mobile device, and therefore both for audio shots and for audio-video shots, it is in fact necessary to be able to orient the transducing cartridges with respect to the sound source.

For this purpose, orientable microphones are known in the background art in which there is a body for connection to the mobile device to which a spherical head is connected which supports the cartridges and can be oriented along two rotation axes, so as to be able to modify its placement as a function of the use of the device in portrait or landscape mode.

However, even this type of orientable stereo microphone is not devoid of drawbacks, including the fact that the stereo cartridge rotation mechanism is rather complicated and delicate, since the audio capture cartridges rotate separately with respect to the main body of the microphone, with a consequent less than optimum use for the user, who has to invest particular attention and care in using the device.

Furthermore, the controls and buttons for adjusting the microphone are arranged on the coupling body, which remains fixed with respect to the mobile device to which it is connected, and therefore always remain oriented in the same position, being difficult to read and maneuver for the user when the head is rotated.

Moreover, the spherical shape of the head entails a transverse space occupation of the microphone that is not negligible and is in any case greater than the mobile device.

SUMMARY OF THE INVENTION

The aim of the present invention is to eliminate the drawbacks described above of the background art, by providing a stereo microphone for mobile devices that allows correct stereo shooting of sound regardless of the operating mode of the device with a structure that is simplified and is such as to require minimal interventions that can be performed easily by users during use.

Within this aim, an object of the present invention is to allow correct and simple repositioning of the sound transducers as a function of the operating mode of the mobile device, both in the case of a recording with the mobile device in portrait mode and in the case of a recording with the mobile device in landscape mode.

A further object of the present invention is to be easy to use regardless of the mode of use of the mobile device.

Another object of the device according to the present invention is to be compact and pleasant in appearance.

Another object of the device according to the present invention is to have a structure that is simple, relatively easy to provide in practice, safe in use, effective in operation, and relatively low in cost.

This aim and these and other objects are achieved by the present stereo microphone for mobile devices, comprising a coupling body provided with means for connection to a mobile device and a supporting body for sound wave transducer means, which are mutually associated so that they can move alternately between a first shooting configuration, which corresponds to the use of the mobile device in portrait mode, and a second shooting configuration, which corresponds to the use of the mobile device in landscape mode, characterized in that said coupling body and said supporting body are mutually associated by interposition of means for pivoting about a single rotation axis.

BRIEF DESCRIPTION OF THE DRAWINGS

Further characteristics and advantages of the present invention will become better apparent from the detailed description of two preferred but not exclusive embodiments of a stereo microphone for mobile devices, illustrated by way of nonlimiting example in the accompanying drawings, wherein.

DESCRIPTION OF THE PREFERRED EMBODIMENTS

With reference to the figures, the numeral 1 generally designates a stereo microphone for mobile devices.

Figures 1, 2:
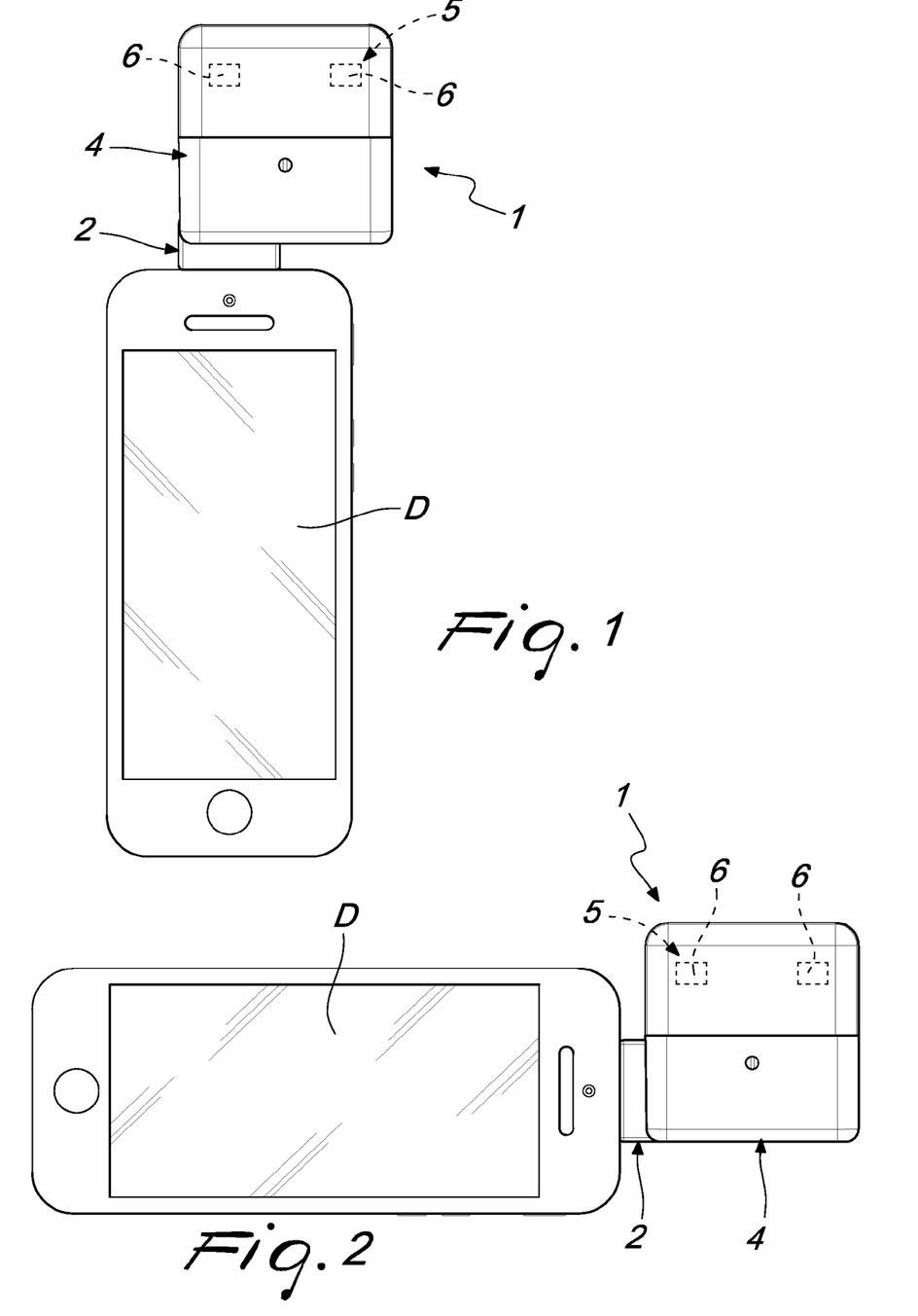
FIGS. 1 and 2 are front elevation views of the use of a first embodiment of a stereo microphone for mobile devices, according to the invention, applied to a mobile device, respectively, in the first shooting configuration and in the second shooting configuration.
Figure 3:
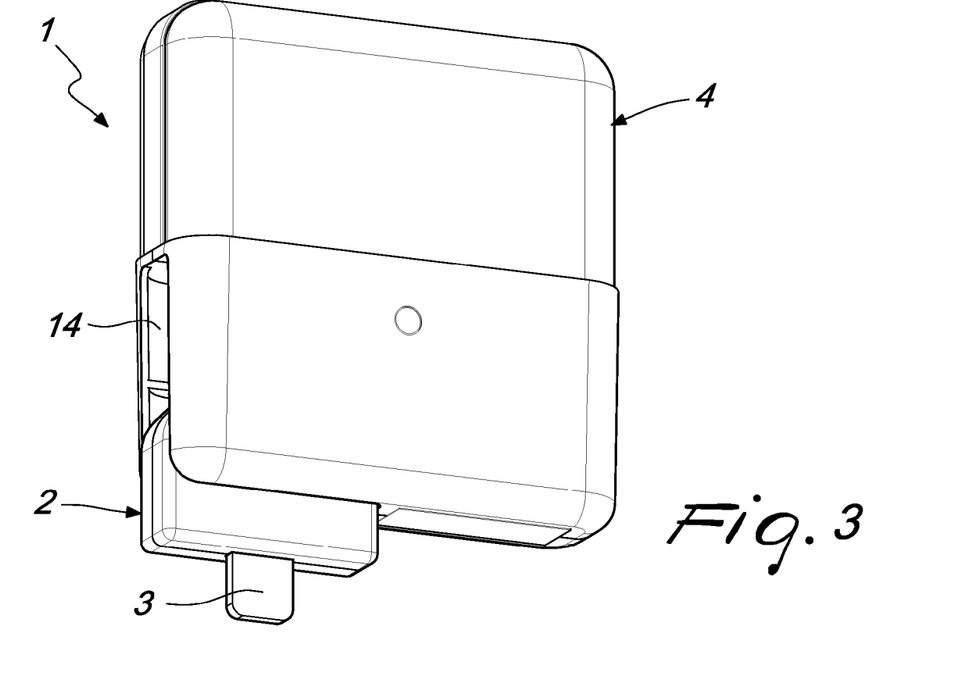
FIGS. 3 and 4 are perspective views of the first embodiment of the microphone according to the invention, respectively, in the first shooting configuration and in the second shooting configuration.
Figure 4:
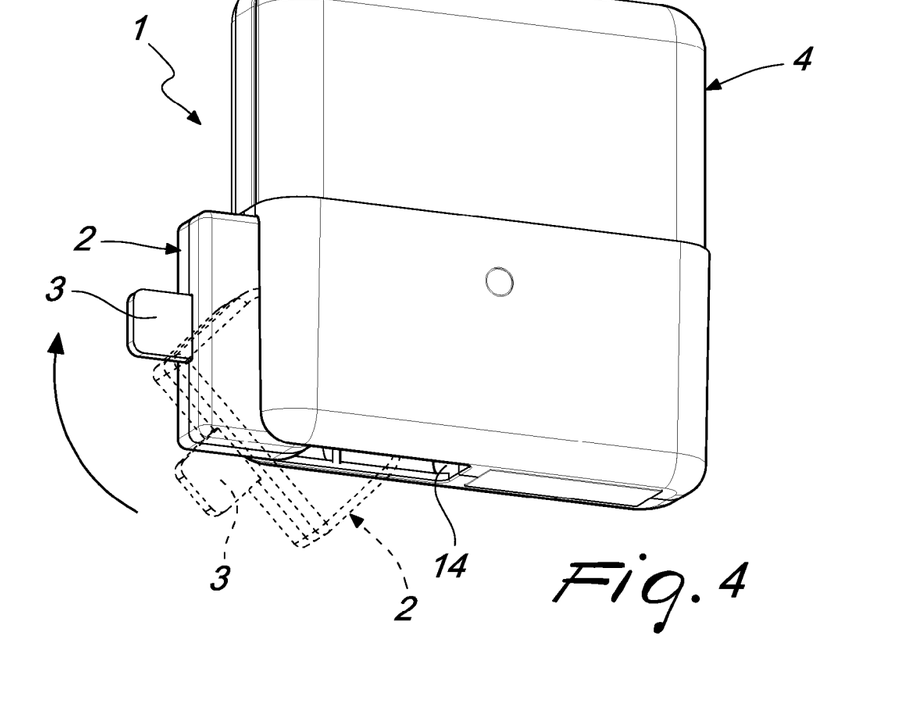
Figure 5:
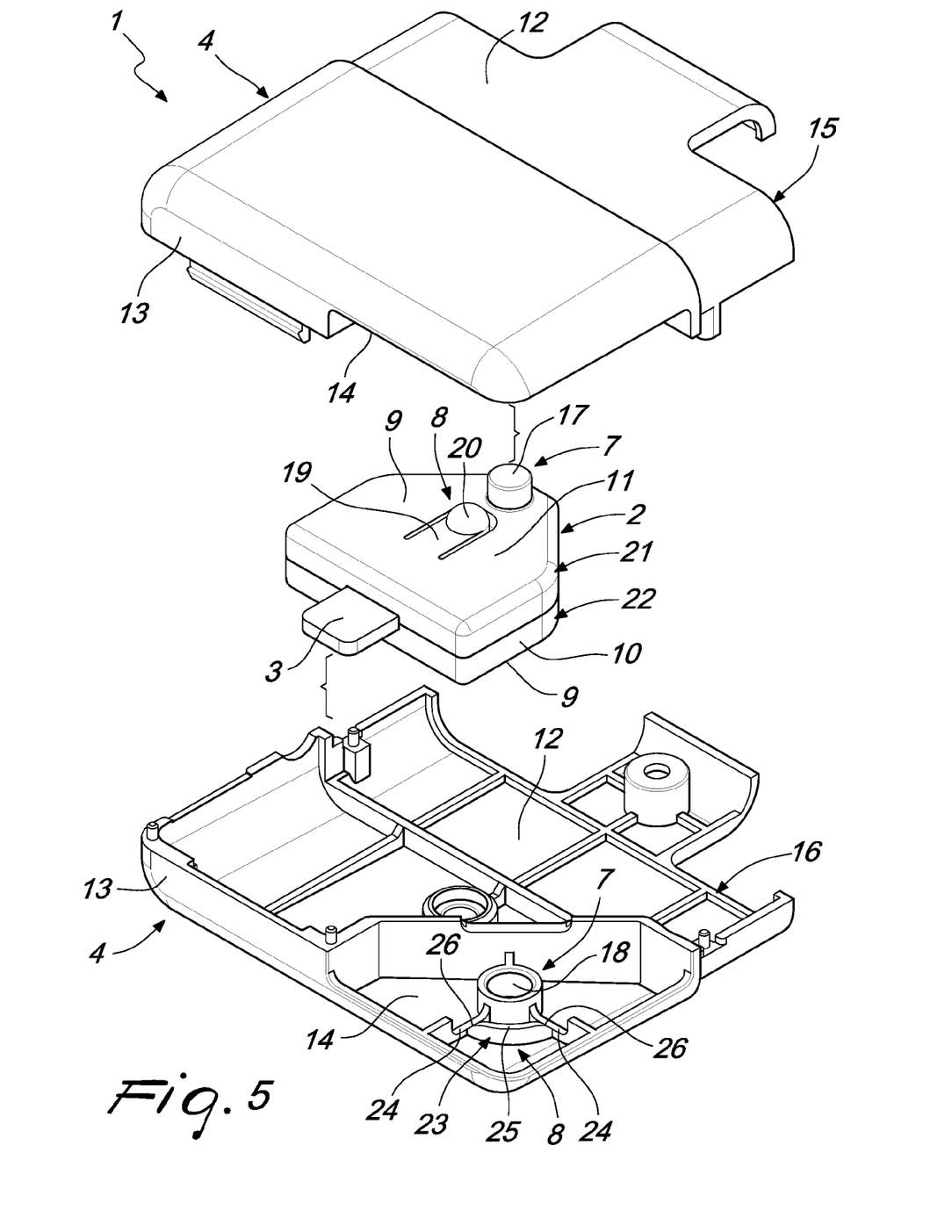
FIG. 5 is an exploded perspective view of the first embodiment of the microphone according to the invention, illustrating only the mechanical components.
Figure 6:
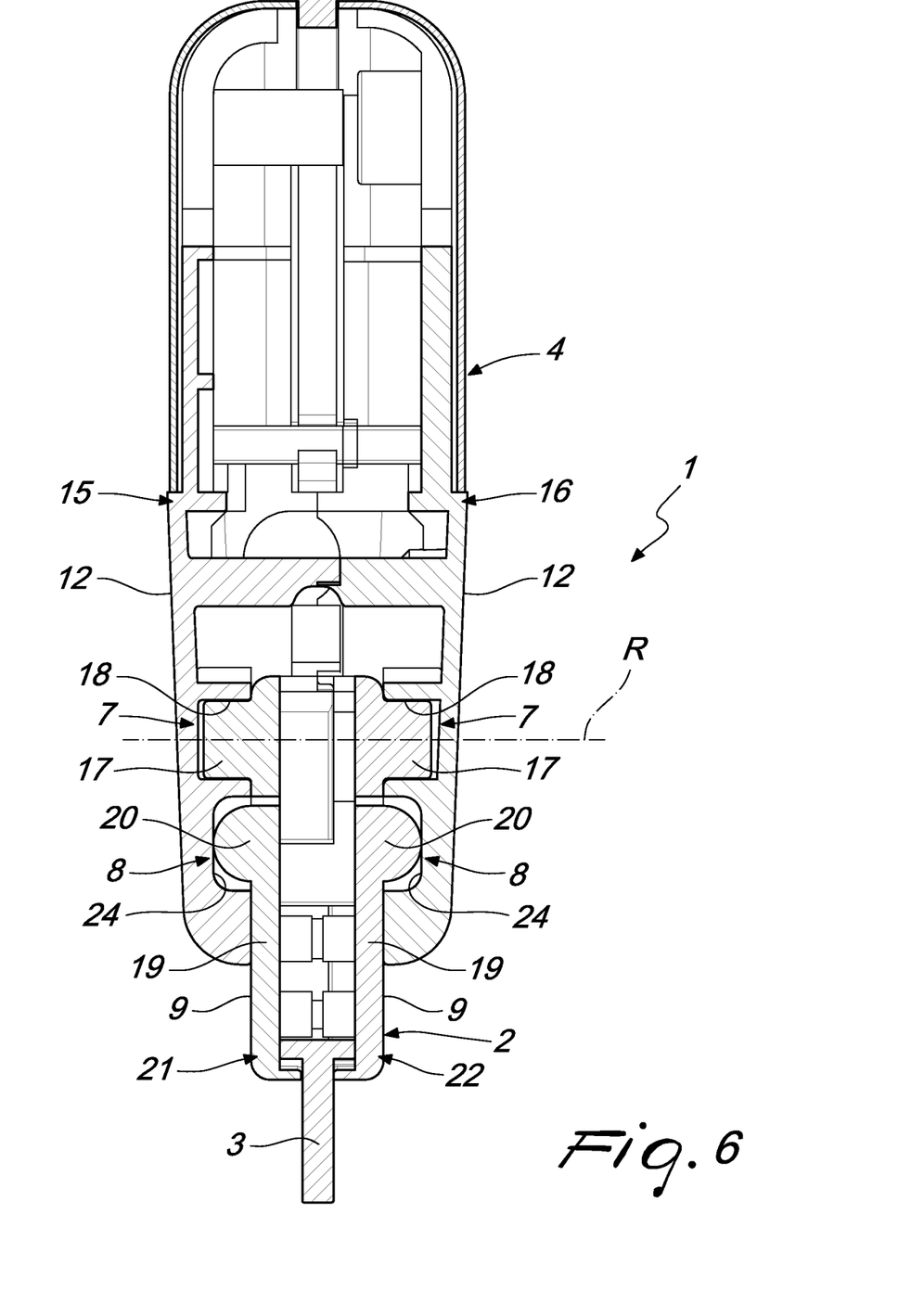
FIG. 6 is a sectional view, taken along a plane that passes through the rotation axis of the first embodiment of the microphone, according to the invention, in the first shooting configuration and with the resilient means for temporary locking in the locking position.
Figure 7:
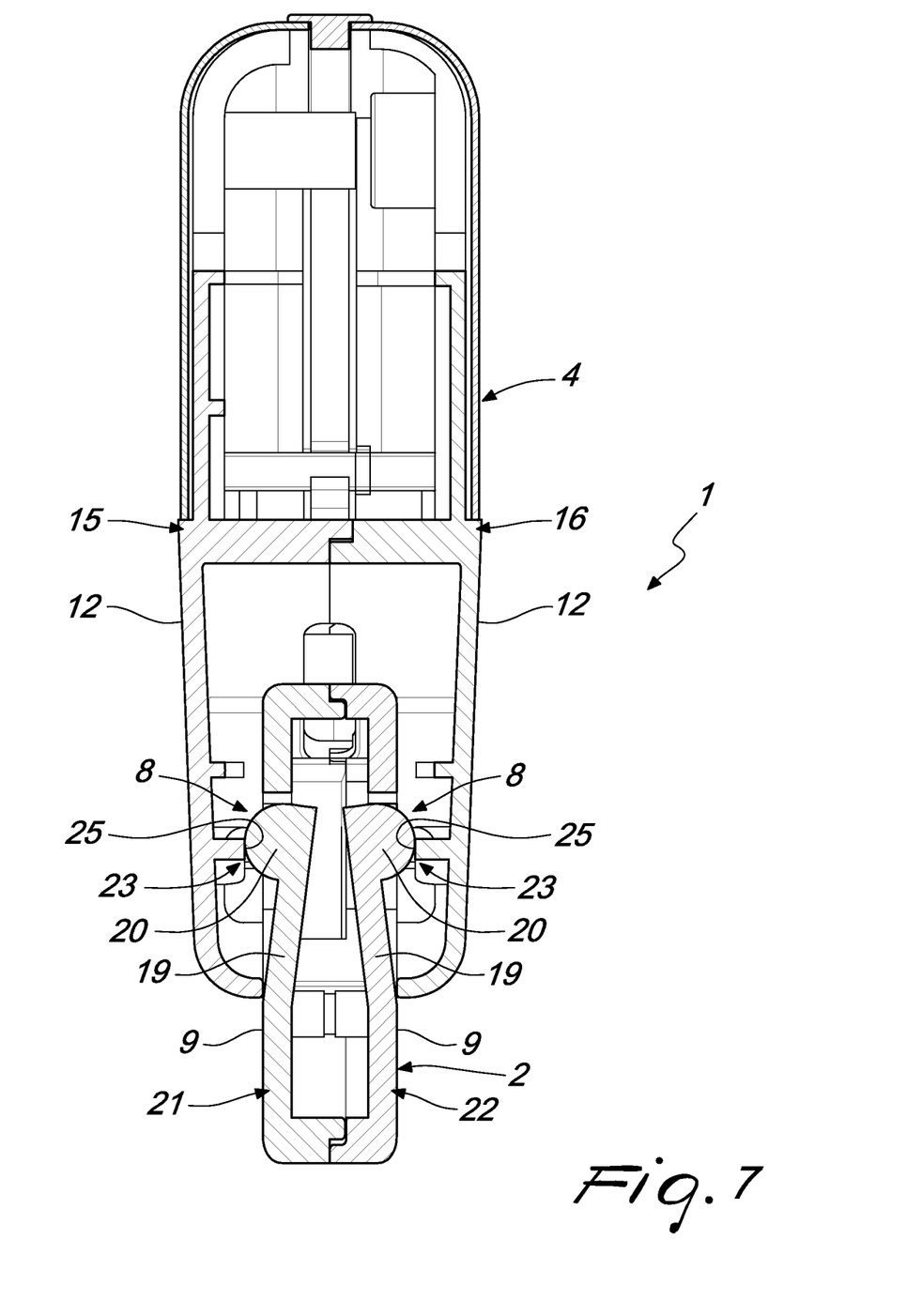
FIG. 7 is a sectional view, taken along a plane that passes through the rotation axis of the first embodiment of the microphone, according to the invention, with the supporting body in an angular position that is intermediate between the shooting configurations and the resilient means for temporary locking in the inactive position.
Figure 8:
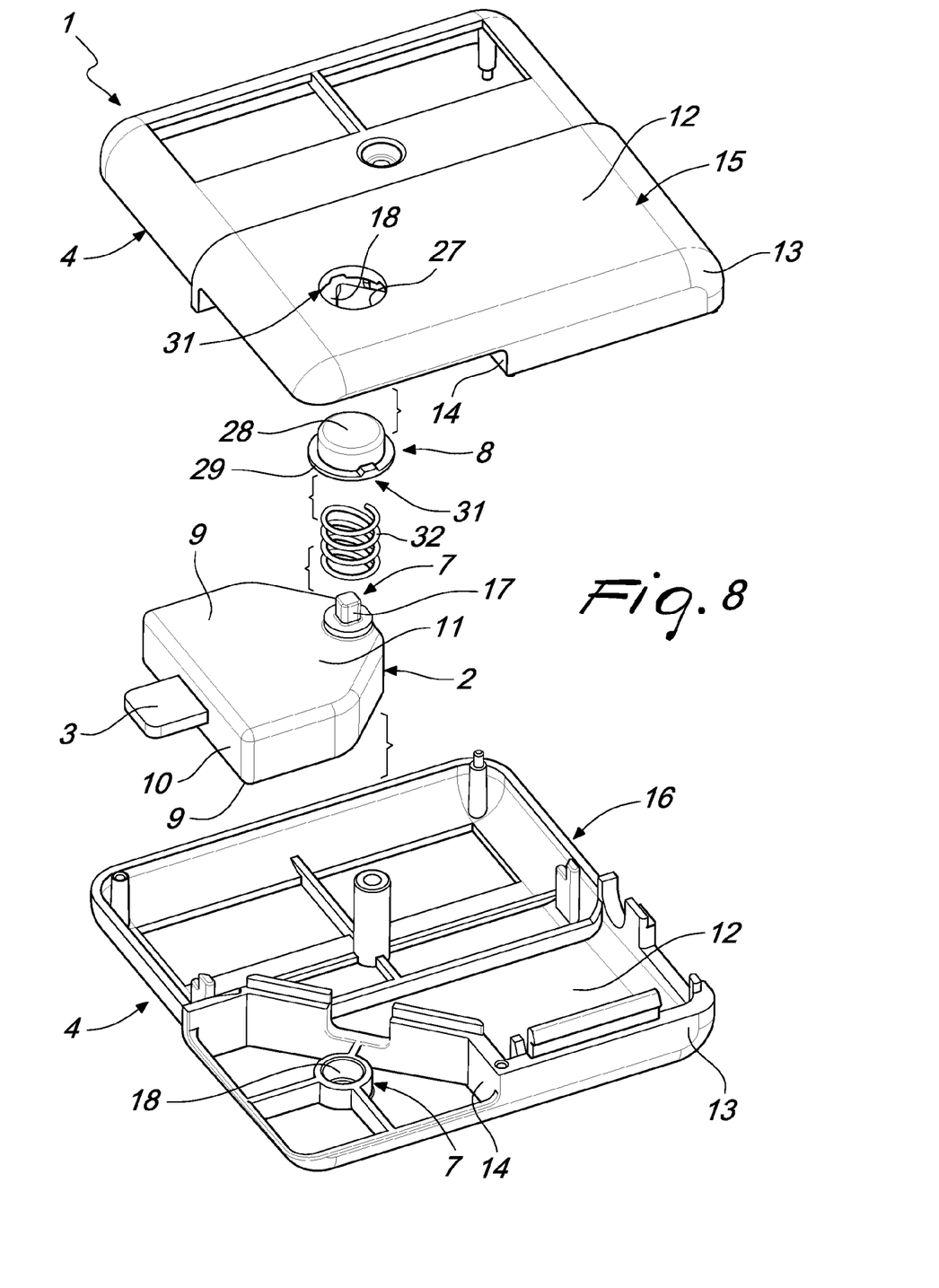
FIG. 8 is an exploded perspective view of a second embodiment of the microphone according to the invention, illustrating only the mechanical components.

It should be noted that in FIGS. 1 and 2 the microphone 1 has been shown applied to a mobile device D in the form of a conventional cellular telephone of the smartphone type, but it can equally be used with a tablet or with any other mobile audio-video recording device provided with interfaces and software that allow to plug in external devices.

The microphone 1 comprises a coupling body 2 provided with means 3 for electromechanical connection to a mobile device D, which are constituted for example by a conventional connector, which varies according to the mobile device. For example, in the case of an Apple iPhone 5 smartphone, the connector can be a so-called "Lightning" connector, whereas in the case of smartphones that run with the Android operating system the connector can be a conventional USB connector.

The microphone 1 further comprises a supporting body 4 for sound wave transducer means 5, which is associated with the coupling body 2 so that it can move alternately between a first shooting configuration, shown in FIG. 1, which corresponds to the mobile device D used in portrait mode, and a second shooting configuration, shown in FIG. 2, which corresponds to the mobile device D used in landscape mode.

The transducer means 5 comprise at least two sound wave transducer cartridges 6, shown schematically in FIGS. 1 and 2, which are adapted to be arranged on opposite sides of the sound source in the shooting configurations, so as to allow a stereophonic recording on the part of the mobile device D by means of the connector 3, according to methods that are known to the person skilled in the art. Therefore, the electrical and electronic components of the microphone 1 are not detailed in the present text, since they are components of a conventional type.

According to the invention, the coupling body 2 and the supporting body 4 are mutually associated by way of pivoting means 7 about a single rotation axis R.

In order to pass from the first shooting configuration to the second shooting configuration and vice versa, it is sufficient for the user to actuate a relative rotation about the rotation axis R of the supporting body 4 with respect to the coupling body 2, which is integral with the mobile device D. The first and the second shooting configurations are mutually angularly spaced by 90° around the rotation axis R.

It should be noted that the bodies 2, 4 are extended substantially with an arrangement that is perpendicular to said rotation axis, being substantially coplanar to the mobile device D to which the microphone 1 is applied.

Furthermore, the microphone 1 has an extension in a direction that is parallel to the rotation axis R comparable to that of the mobile device D to which it is applied.

Conveniently, there are resilient means 8 for temporary locking of the rotation of the supporting body 4 with respect to the coupling body 2 at the shooting configurations, so as to avoid, during use, the occurrence of accidental displacements of said supporting body and of the transducer means 5 associated therewith, which might penalize the quality of the recording obtained.

Furthermore, it should be noted that the user interface means, not shown in the figures, for controlling and/or adjusting the transducer means 5 are associated advantageously with the supporting body 4 and rotate together with it with respect to the coupling body 2 that is integral with the mobile device D, so as to modify their orientation and be easier to use for the user. In fact, if these interface means have graduated scales or other indications that must be read by the user, they are always oriented so that the user can easily interpret them regardless of the mode of use of the mobile device D.

In greater detail, the coupling body 2 has a substantially prism-like thin shape and is provided with a pair of mutually opposite main faces 9 that are polygonal and perpendicular to the rotation axis R and between which a perimetric band 10 of reduced thickness is extended. The coupling body 2 has a tab 11 on the opposite side of the connector 3. The supporting body 4 is substantially shaped like a thin parallelepiped and is provided with a pair of mutually opposite main surfaces 12, which have a square shape with corners that are rounded and perpendicular to the rotation axis R and are mutually connected by a perimetric band 13. Between the main surfaces 12, at a corner, there is a pocket 14 for the insertion of the tab 11.

In the illustrated embodiment, in order to allow the assembly of the microphone 1, the supporting body 4 has a boxlike shape and is constituted by two half-shells 15, 16, each of which comprises a respective main surface 12 and a portion of perimetric band 13, which are coupled by way of conventional interlocking means, which are not detailed.

Therefore, the pocket 14 is defined by a discontinuity of the perimetric band 13 that allows the insertion of the tab 11 and the relative movement of the supporting body 4 with respect to the coupling body 2.

The coupling body 2 also is constituted by a pair of half-shells 21, 22 and is internally hollow.

The pivoting means 7 are interposed between at least one of the main faces 9 and the main surface 12 that is adjacent thereto at the pocket 14.

In particular, the pivoting means 7 have at least one pivot 17 that lies along the rotation axis R and protrudes from a main face 9 at the tab 11 and at least one corresponding seat 18 that is associated internally with the main surface 12 that is adjacent at the pocket 14.

Preferably, the pivoting means 7 are provided with two pivots 17, which are aligned along the rotation axis R and protrude on opposite sides of the coupling body 2 and two seats 18 associated with respective main surfaces 12.

In a first embodiment (FIGS. 1-7), the resilient means 8 comprise at least one elastically flexible tongue 19, which has an end that is associated with a corresponding main face 9 at the tab 11 and the opposite end that can move with respect to said face and is provided with a rounded head 20. In the embodiment shown, the tongue 19 is defined directly on the coupling body 2, which is made of a material that has the desired characteristics of flexural elasticity, and is cut into the corresponding main face 9, but it might also be constituted by an element that is applied to the coupling body 2.

The tongue 19 can move between an inactive position (FIG. 7), in which it is flexed with the head 20 partially retracted into the coupling body 2 so as to uncouple the rotation of the supporting body 4, and a locking position (FIG. 6), in which the head 20 protrudes completely outside the coupling body 2 so as to block temporarily the rotation of the supporting body 4 in one of the two shooting configurations.

Furthermore, the resilient means 8 have at least one track 23 for the abutment of the head 20 that is associated internally with the main surface 12 that is adjacent at the pocket 14. Said track 23 is provided with end recesses 24 for accommodating the head 20 at the shooting configurations and with a raised arch 25 that is interposed between the recesses 24 in order to keep the tongue 19 in the inactive position during the rotation of the supporting body 4 between the two shooting configurations. Between each recess 24 and the arc 25 there is an inclined ramp 26 for the gradual transition of the tongue 19 between the locking position and the inactive position.

In this manner, the track 23 acts as a cam and the head 20 acts as a pusher.

Advantageously, the resilient means 8 have two tongues 19 defined on the mutually opposite main faces 9 and two tracks 23, each cooperating with the head 20 of a corresponding tongue 19, which are defined inside the pocket 14 on the mutually opposite main surfaces 12.

According to this embodiment, thanks to the shape of the tracks 23, when the user imparts a rotation to the supporting body 4 with respect to the coupling body 2 about the rotation axis R, the heads 20 disengage from the corresponding recesses 24 and pass from the locking position to the inactive position until the other shooting configuration is reached, in which they engage again in the corresponding recesses 24, preventing temporarily the relative rotation between the bodies 2 and 4.

In a second embodiment (FIGS. 8-13), the seat 18 is provided on one of the half-shells 15 and passes through the corresponding main surface 12 so as to define thereon a slot 27.

The resilient means 8 are provided with a button 28 that can be accessed through the slot 27 and is fitted on the corresponding pivot 17 so as to be able to slide along the rotation axis R between an inactive position, in which it is close to the coupling body 2 during the rotation of the supporting body 4 between the shooting configurations, and a locking configuration, in which it is spaced from the coupling body 2 at the shooting configurations.

The button 28 is cup-shaped and is provided at the base with a collar 29 that protrudes in a radial direction with respect to the rotation axis R, which is adapted to abut internally against the corresponding main surface 12 on a band 30 that is perimetric with respect to the slot 27 when the button is in the locking position.

The button 28 can slide along the seat 18 and is provided internally with a cylindrical jacket 35 that is fitted directly on the pivot 17.

The resilient means 8 further have elements for mutual interference 31 that are interposed between the collar 29 and the band 30, so as to retain the supporting body 4 in the shooting configurations when the button 28 is in the locking position, and elastic means 32 in order to keep said button in the locking position.

The elastic means 32 are provided with a helical compression spring that is fitted on the pivot 17 and is interposed between the button 28 and the coupling body 2.

Figure 9:
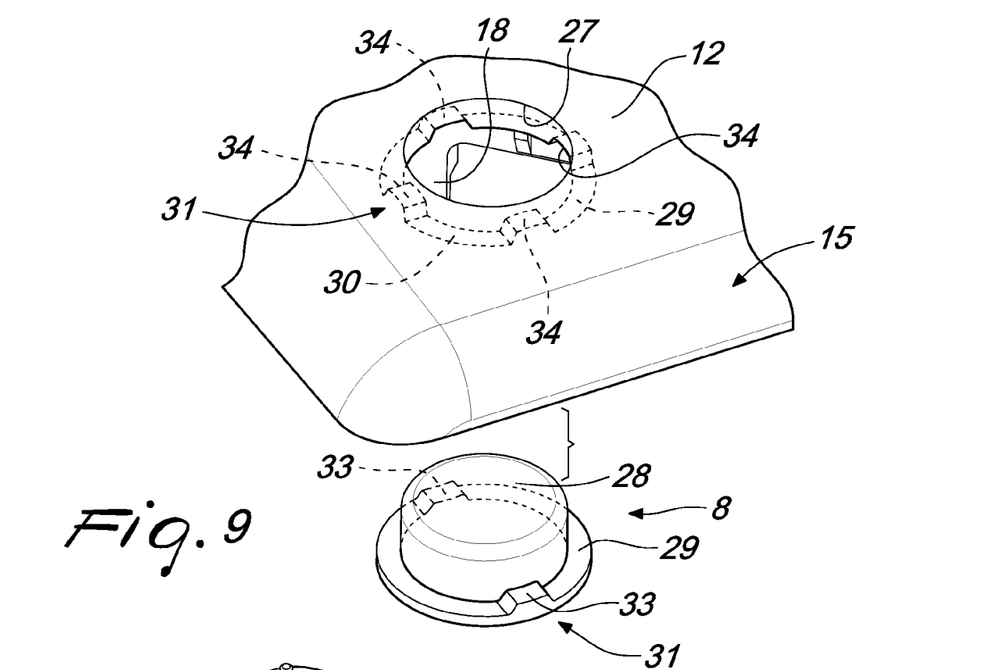
FIG. 9 is an enlarged-scale view of a detail of FIG. 8 related to the resilient means for temporary locking.
Figure 10:
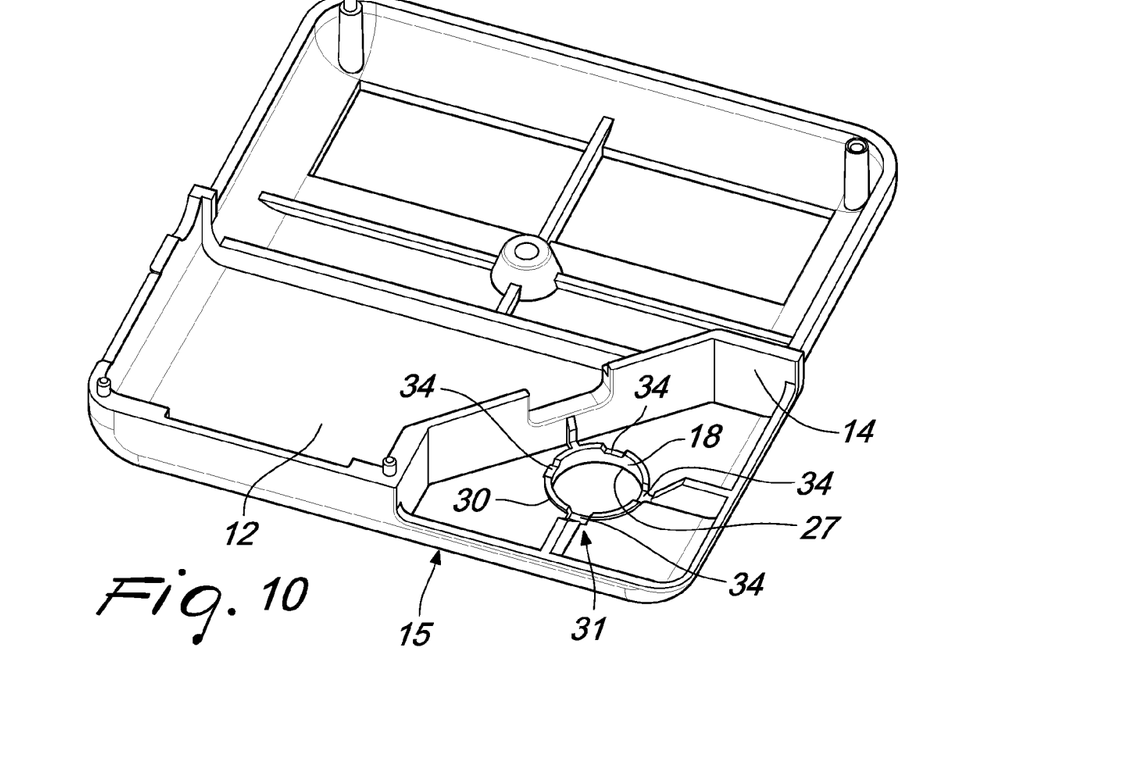
FIG. 10 is a perspective view of a portion of the supporting body of FIG. 8.
Figure 11:
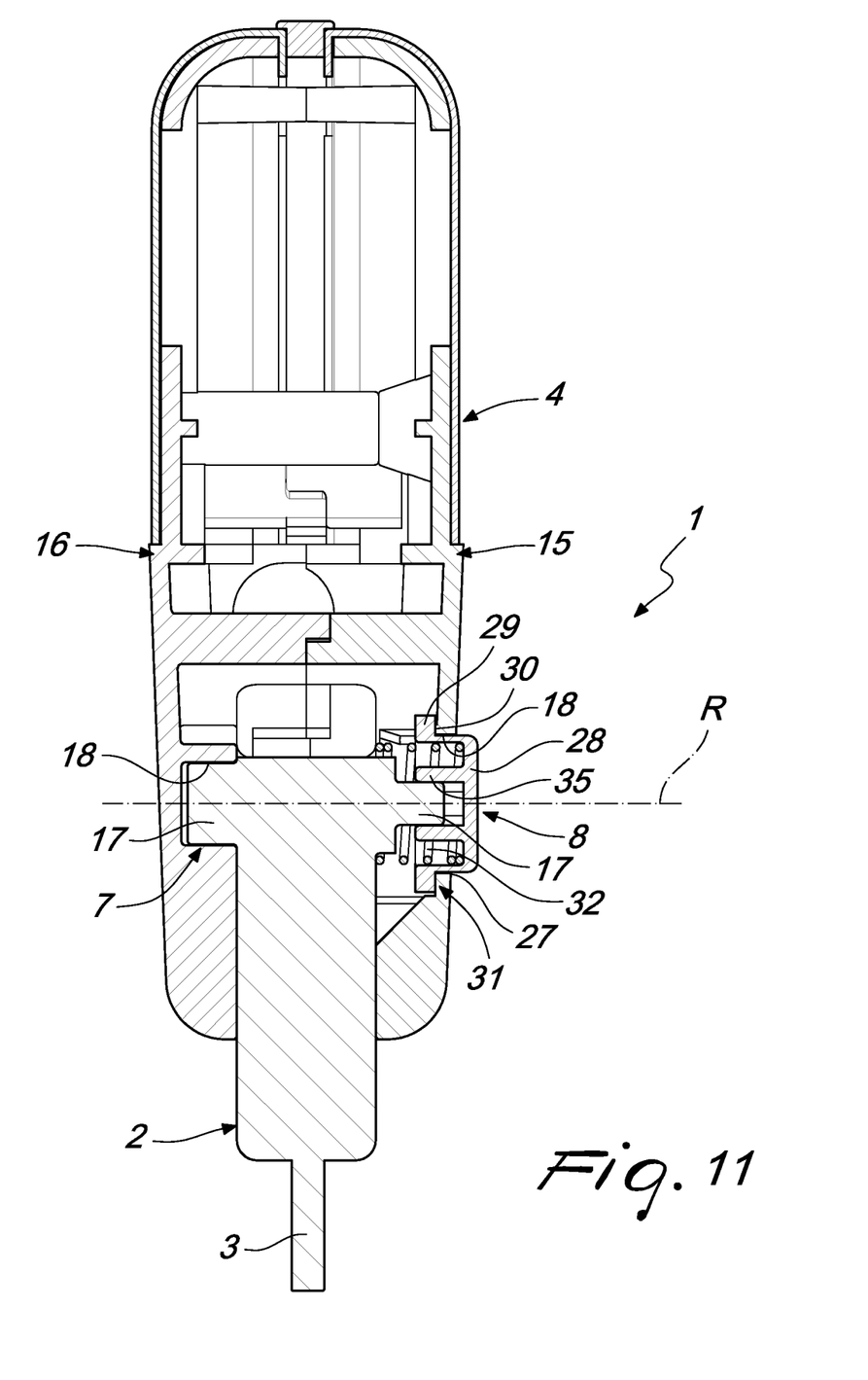
FIG. 11 is a sectional view, taken along a plane that passes through the rotation axis of the second embodiment of the microphone, according to the invention, in the first shooting configuration and with the resilient means for temporary locking in the locking position.
Figure 12:
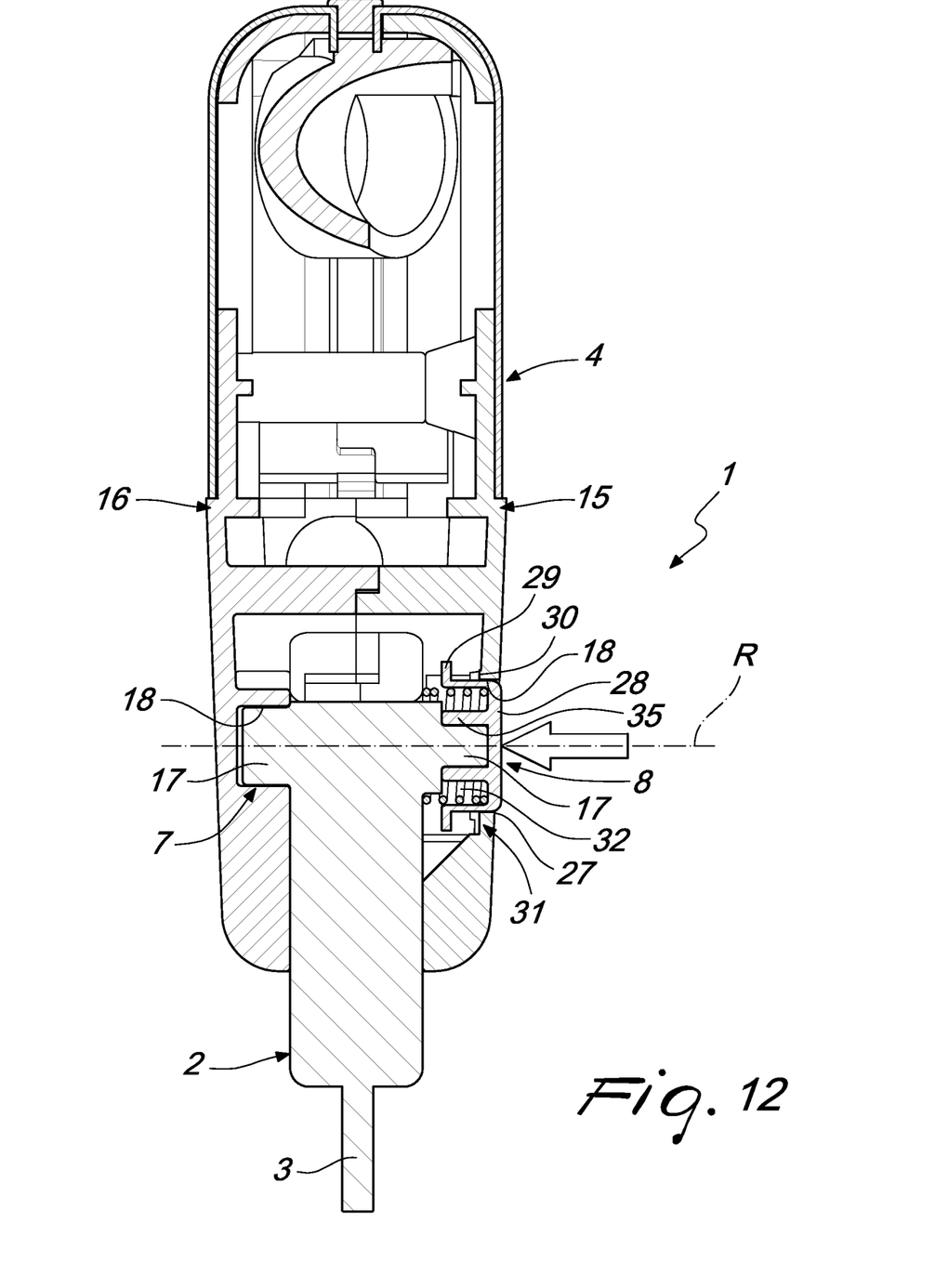
FIG. 12 is a view, similar to FIG. 11, but with the resilient means for temporary locking in the inactive position.

The elements 31 are constituted by a pair of teeth 33 that are extended axially, have a trapezoidal cross-section and protrude from the collar 29 toward the band 30 in diametrically opposite positions and by four corresponding hollows 34 provided in the band 30, angularly spaced in pairs by 90° (FIG. 9). For each shooting configuration, the teeth 33 engage in a corresponding pair of hollows 34 arranged on diametrically opposite sides of the band 30.

Figure 13:
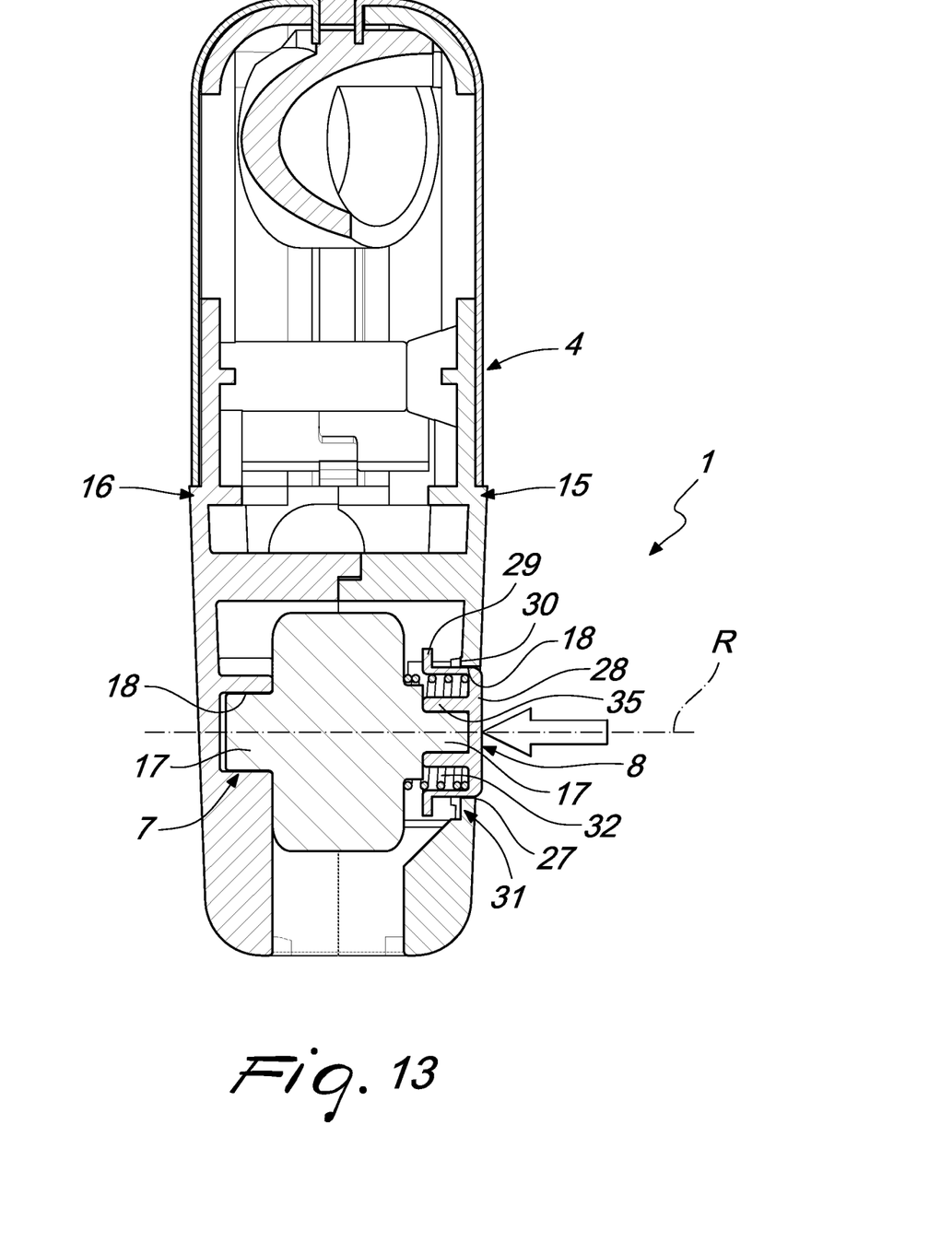
FIG. 13 is a sectional view, taken along a plane that passes through the rotation axis of the second embodiment of the microphone, according to the invention, in an angular position that is intermediate between the shooting configurations and with the resilient means for temporary locking retained in the inactive position.

According to this embodiment, in order to move the microphone 1 from one shooting configuration to the other it is sufficient for the user to press the button 28 toward the inactive position (FIG. 12), so as to disengage the mutual interference elements 31, and, while keeping the button 28 pressed so as to contrast the spring 32, actuate the rotation of the supporting body 4 with respect to the coupling body 2 about the rotation axis R (FIG. 13). At the other shooting configuration, by way of the spring 32, the mutual interference elements 31 re-engage, locking the microphone in the desired shooting configuration.

In practice it has been found that the described invention achieves the intended aim and objects, and in particular the fact is stressed that the microphone according to the invention has a structure that is simplified both from the constructive standpoint and in terms of use.

The user can in fact modify easily the shooting configuration with a single movement of the supporting body, the interface means being always oriented correctly for reading them.

Not least, the microphone according to the invention is compact and has a pleasant appearance.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to the requirements without thereby abandoning the protective scope of the appended claims.

The disclosures in Italian Patent Application No. MO2014A000248 (102014902290501) from which this application claims priority are incorporated herein by reference.

What is claimed is:

1. A stereo microphone for mobile devices, comprising a coupling body provided with means for connection to a mobile device and a supporting body for sound wave transducer means, which are mutually associated and configured so that they can move alternately between a portrait mode shooting configuration, and a landscape mode shooting configuration, wherein said coupling body and said supporting body are mutually associated by interposition of means for pivoting about a single rotation axis.

2. The microphone according to claim 1, further comprising resilient means for locking temporarily the rotation of said supporting body with respect to said coupling body at said first and second shooting configuration.

3. The microphone according to claim 1, further comprising means for interfacing with the user for control and/or adjustment of said transducer means, which are associated with said supporting body.

4. The microphone according to claim 1, wherein said transducer means comprise at least two capsules for transducing sound waves, which are adapted to be positioned on opposite sides of a source of sound in said first and second shooting configuration.

5. A stereo microphone for mobile devices, comprising a coupling body provided with means for connection to a mobile device and a supporting body for sound wave transducer means, which are mutually associated so that they can move alternately between a first shooting configuration, which corresponds to the use of the mobile device in portrait mode, and a second shooting configuration, which corresponds to the use of the mobile device in landscape mode, wherein said coupling body and said supporting body are mutually associated by interposition of means for pivoting about a single rotation axis, wherein said coupling body has a pair of main faces which are mutually opposite and substantially perpendicular to said single rotation axis, and wherein said supporting body has a pair of mutually opposite main surfaces that are substantially perpendicular to said single rotation axis and between which there is a pocket for the insertion of a tab of said coupling body, the pivoting means being interposed between at least one of said main faces and a main surface that is adjacent thereto at the pocket.

6. The microphone according to claim 5, wherein said pivoting means comprise at least one pivot that lies along said rotation axis and protrudes from one of said main faces at said tab and at least one seat for the accommodation of said at least one pivot, which is associated internally with the main surface that is adjacent at said pocket.

7. The microphone according to claim 6, wherein said resilient means comprise at least one elastically flexible tongue, which is associated with one of said main faces at said tab and is provided with a head that can move between an inactive position during the rotation of said supporting body between said shooting configurations and a locking position at said shooting configurations, and wherein said supporting body is provided inside said pocket with at least one track for the abutment of the head of said tongue for its movement between the inactive position and the locking position.

8. The microphone according to claim 7, wherein said resilient means comprise two of said tongues, which are associated with respective main faces of said coupling body at said tab and cooperate with respective tracks associated with the main surfaces of said supporting body inside said pocket.

9. The microphone according to claim 6, wherein said resilient means comprise a button that can be accessed from said at least one seat and is fitted on said at least one pivot so that it can slide along said rotation axis between an inactive position, at the rotation of said supporting body between said shooting configurations, and a locking position at said shooting configurations, which is provided at the base with a collar that protrudes in a radial direction and is adapted to abut inside the corresponding main surface at a band that is perimetric with respect to said seat in the locking position, elements for mutual interference being provided which are interposed between the collar and the band at said shooting configurations and elastic means being provided for retaining the button in the locking position.

10. The microphone according to claim 6, further comprising two of said pivots that protrude from respective main faces of said coupling body at said tab and are accommodated in respective seats associated with said main surfaces within said pocket.

\* \* \* \* \*